United States Patent [19]

Hartmann et al.

[11] Patent Number: 4,633,935
[45] Date of Patent: Jan. 6, 1987

[54] METHOD FOR THE COOLING OF HOT GASEOUS SOLIDS SUSPENSIONS OF TITANIUM DIOXIDE

[75] Inventors: Achim Hartmann, Pulheim; Dietrich W. Schönherr, Odenthal, both of Fed. Rep. of Germany

[73] Assignee: Kronos Titan-GmbH, Fed. Rep. of Germany

[21] Appl. No.: 718,523

[22] Filed: Apr. 1, 1985

Related U.S. Application Data

[63] Continuation of Ser. No. 463,409, Feb. 3, 1983, Pat. No. 4,569,387.

[30] Foreign Application Priority Data

Feb. 13, 1982 [DE] Fed. Rep. of Germany ....... 3205213

[51] Int. Cl.$^4$ .............................................. F24H 3/00
[52] U.S. Cl. ......................................... 165/1; 165/47; 165/143; 165/144; 165/147; 165/154
[58] Field of Search .................. 165/1, 143, 144, 146, 165/147, 154, 47, 95, 119, 133, DIG. 5, 903; 62/401

[56] References Cited

U.S. PATENT DOCUMENTS

| | | |
|---|---|---|
| 2,914,915 | 12/1959 | Sziklas et al. .................... 165/133 X |
| 3,443,630 | 5/1969 | Auld ......................................... 165/1 |
| 3,457,038 | 7/1969 | Kulling et al. ....................... 165/1 X |
| 3,511,308 | 5/1970 | Nerlinger ................................. 165/1 |

FOREIGN PATENT DOCUMENTS

| | | |
|---|---|---|
| 936450 | 12/1955 | Fed. Rep. of Germany ... 165/DIG. 5 |
| 1923614 | 11/1969 | Fed. Rep. of Germany . |
| 2005011 | 8/1971 | Fed. Rep. of Germany . |
| 1767798 | 9/1971 | Fed. Rep. of Germany . |
| 651775 | 4/1951 | United Kingdom ................ 165/182 |
| 1347865 | 2/1974 | United Kingdom . |
| 2115132 | 9/1983 | United Kingdom ......... 165/DIG. 5 |

Primary Examiner—William R. Cline
Assistant Examiner—Randolph A. Smith
Attorney, Agent, or Firm—Browning, Bushman, Zamecki & Anderson

[57] ABSTRACT

The invention concerns a device for the cooling of hot gaseous solids suspensions, particularly for the cooling of hot gaseous TiO$_2$ suspensions resulting from the production of titanium dioxide by vapor phase oxidation of titanium tetrachloride. The device consists of a number of coaxially connected constructional units, each of which consists of three jacketed tubes, i.e., tubes 1, 2 and 3, which are coaxially connected in such a way that tube 1 conically tapers toward tube 2 and that tube 3 is larger in diameter than tube 2. Heat transfer is twice as high in the device of the invention as in a comparable conventional cooling tube of uniform inner diameter; moreover, the demand of scrub solids needed to prevent the formation of deposits on its walls is reduced to one third of the quantity needed in a conventional cooling tube.

8 Claims, 1 Drawing Figure

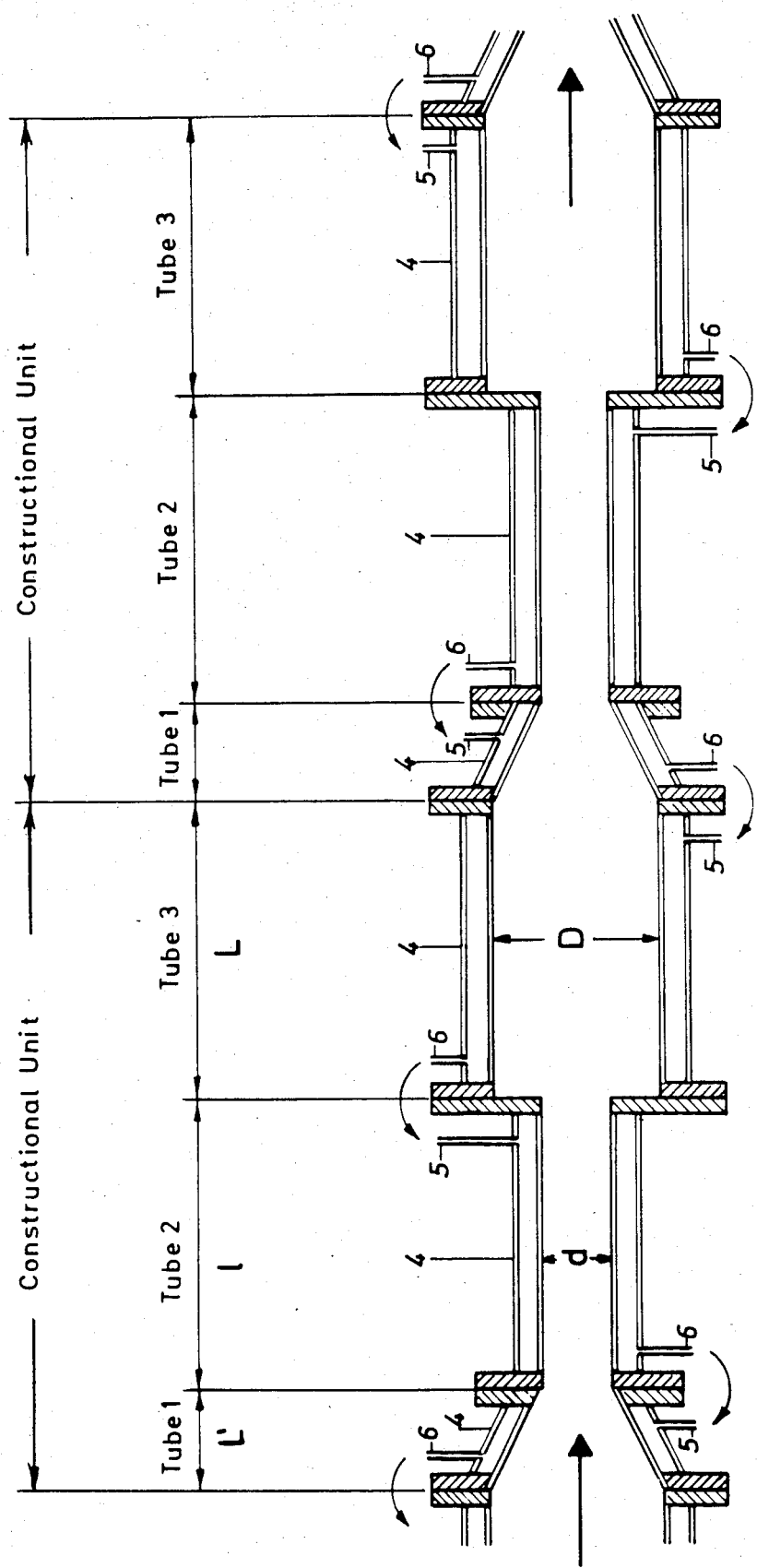

METHOD FOR THE COOLING OF HOT GASEOUS SOLIDS SUSPENSIONS OF TITANIUM DIOXIDE

This is a continuation of application Ser. No. 453,409 filed Feb. 3, 1983 now U.S. Pat. No. 4,569,387.

BACKGROUND OF THE INVENTION

1. Field of the Invention

The invention concerns a device for the cooling of hot gaseous suspensions of solids, particularly hot gaseous $TiO_2$ suspensions resulting from the production of titanium dioxide by oxidation of titanium tetrachloride in the vapor phase.

In many chemical processes for the poduction of solids, the reactants are reacted in the vapor phase at high temperatures with the result that the desired solids are usually obtained finely divided and suspended in the gas stream.

This involves the problem of cooling these hot gaseous suspensions in suitable devices (heat exchangers) so that the solid and the gaseous components can subsequently be separated in suitable separators like cyclones, bag filters, electric precipitators etc.

Examples of such reactions are the production of metal or metalloid oxides like $TiO_2$, $Fe_2O_3$ and $SiO_2$ by oxidation of their halogenides in the vapor phase and the production of carbon black.

Particularly the production of titanium dioxide by vapor phase oxidation of titanium tetrachloride with oxygen or an oxygen-containing gas like air has in recent times gained in importance over the older production methods in which titaniferous ores are digested with an acid since, in vapor phase oxidation, only solid and gaseous end products are obtained, thus eliminating the problems connected with the disposal of the waste acid.

The titanium tetrachloride is oxidized in a reaction chamber, usually with oxygen used as the oxidant. For the purpose of enhancing certain properties of the pigment, small quantities of other substances like water, aluminum chloride and/or silicon tetrachloride and/or zirconium tetrachloride may be added during oxidation.

Oxidation of titanium tetrachloride is a weakly exothermic reaction. The feed materials are therefore preheated, e.g. by indirect heating method, so as to sustain the reaction. Instead of or in addition to preheating, the energy may also be added directly in the form of an auxiliary flame that is, for instance, obtained by burning carbon monoxide.

The oxidizing agent, i.e. oxygen or air, is added at an excess relative to the stoichiometric quantity of oxygen required for the oxidation of the titanium tetrachloride and any other oxydizable substances present. The solids obtained in the reaction mixture are finely distributed titanium dioxide and, as the case may be, admixtures of small quantities of other oxides resulting from the cooxidation of additives. The gaseous constitutents of the reaction mixture are chlorine, oxygen, and nitrogen, and, as the case may be, carbon dioxide and low quantities of steam or hydrochloric acid formed by the reaction of the steam with chlorine.

The most important constituent of the reaction mixture is the titanium dioxide obtained in the oxidation of the titanium tetrachloride, which is present very finely distributed in the reaction gases as a fumelike gaseous $TiO_2$ suspension. The $TiO_2$ particles thus obtained are sticky in the temperature range between discharge from the reactor down to the range of about 350° to 700° C. and therefore show a strong tendency to clinging to surfaces in the form of tough, tightly adhering deposits which show little or no tendency to come off on their own. Silicon dioxide and carbon black behave in a similar manner. It so happens that deposits growing thicker and thicker form in the tubes, thus reducing the effective inner diameter of the tubes and, as a consequence, impairing heat transfer and eventually requiring operations to be suspended.

In the hot reaction zone, the primary particles tend to grow.

When retained too long in the hot zone, the $TiO_2$ particles produced will aggregate, forming irregularly shaped pigment particles with widened particle size range and deteriorated pigmentary properties, e.g., reduced lightening and hiding power, or impaired dispersibility as a consequence of partial sintering of the particles.

The $TiO_2$ formed in the reaction zone must, for this reason, be cooled down rapidly as soon as it leaves the reaction chamber.

To obtain optimum pigment quality, the gaseous $TiO_2$ suspension must be cooled down within a certain limited distance (cooling duct) and within a certain limited period of time and to such a degree that thereafter $TiO_2$ can be separated from the gaseous constituents in a manner as customary in normal practice. A device (heat exchanger) suited for this purpose must be made of a material that is resistant to hot chlorine gas, it must moreover not allow deposits of fine-sized $TiO_2$ to form on its walls during operation, and any thin deposits forming after all must be easily removable, e.g., by the introduction of chemically inert scrub solids without exposing the interior walls of the device to significant damages by abrasion. Only if these conditions are met, will consistent heat exchange between the hot reaction mixture and the cooling device be obtained, which is an essential requirement for the production of titanium dioxide of consistent quality in the optimum particle size range.

2. Description of the Prior Art

According to U.S. Pat. No. 2,721,626, the hot gaseous $TiO_2$ suspension is cooled in an aluminum tube consisting of a series of 180° bends. The formation of deposits on the walls is prevented by adding cold, chemically inert solid particles like sand or calcined $TiO_2$ larger in particle size than the $TiO_2$ present in the reaction mixture. Although the scrubbing effect of the solid particles is very good in the 180° bends, abrasion is at the same time high.

According to U.S. Pat. No. 2,899,278, it is proposed to use a titanium dioxide milled in a fluid energy mill, then washed with water and finally granulated by heat treatment as scrub solids material. Although this material shows good scrubbing effect and although lower amounts may be used than in the case of coarser materials, this does not solve the problem of abrasion in the bends of the heat exchanger either.

According to German patent application DE-OS No. 17 67 798, the cooling tube is, in its essential parts to be made of magnesium or a magnesium compound on which the $TiO_2$ made by vapor phase oxidation shows less tendency to depositing than on aluminum. The problem of abrasion in the bends of the cooling tubes does, however, continue to exist.

In German patent application DE-OS No. 19 23 614, water-soluble salts, free from water, e.g., salts of alkali and earth alkali metals, particularly sodium chloride, are proposed to be used as scrub solids; they must, however, be washed out in the further course of the pigment production process as they are foreign to the system and do not solve the abrasion problem either.

Also other ways have been proposed:

In the German patent application DE-OS No. 20 05 011, it is proposed to mix cold gas into the hot gaseous solids suspension and with a change of direction to introduce it into an expanding chamber, in which the formation of deposits is prevented mechanically, whereafter the product stream is once more subjected to a change of direction. The mechanical installations complicate the device and increase its susceptibility to abrasion.

Finally, German Patent DE-PS No. 12 83 818 proposes to introduce the hot gaseous TiO$_2$ suspension into a cooling chamber, which conically tapers off at its lower end, by introducing a cooling gas into the cooling chamber in counterflow to the hot reaction mixture, in which process the cooling gas must be produced by a complicated method of cleaning the reaction gases.

SUMMARY OF THE INVENTION

Purpose of the present invention is the construction of a device for the cooling of hot gaseous solids suspensions, particularly hot gaseous TiO$_2$ suspensions obtained in the production of titanium dioxide by oxidation of titanium tetrachloride in the vapor phase, which does not show the disadvantages of the known devices.

The invention solves this problem by providing a device for the cooling of gaseous solids suspensions, which is characterized by a number of coaxially connected constructional units, each of which comprises a series of tubes coaxially connected with each other in the following arrangement:

(a) tube 1 of length L', conically tapering towards the end opening into tube 2;

(b) tube 2 of inner diameter d and length l;

(c) tube 3 of inner diameter D and length L, with D being larger than d;

(d) jacket tubes 4 surrounding tubes 1, 2 and 3, provided with feed tubes 5 and discharge tubes 6 for a cooling agent.

BRIEF DESCRIPTION OF THE DRAWING

The single FIGURE shows schematically an embodiment of the present invention.

DESCRIPTION OF THE PREFERRED EMBODIMENT

The invention relates, in particular, to a device used for the cooling of hot gaseous TiO$_2$ suspensions resulting from the production of titanium dioxide by oxidizing titanium tetrachloride in the vapor phase.

The constructional units are installed in the cooling duct between the reaction chamber and the collection devices for the cooled titanium dioxide in such a manner that the cooling duct is made up entirely or partly of such constructional units, depending on the quantity of heat to be removed.

To prevent the formation of deposits on the inner walls of the tubes, chemically inert scrub solids suspended in a carrier gas are introduced into the hot reaction gas mixture through injection tubes downstream of the reaction chamber, preferably coaxially with the flow of the hot gaseous solids suspension.

The material suited best to serve as scrub solids is milled, calcined titanium dioxide ranging in particle size between 0.1 and 5.0 mm, preferably between 2 and 3 mm; but also other chemically inert substances of sufficient hardness, e.g. sand, may be chosen.

For a carrier gas, nitrogen may for instance be used.

The temperature in the reaction chamber is in the range of 1200° and 2000° C., which is greatly dependent on the oxydant used for the oxidation of the titanium tetrachloride, i.e., whether air, oxygen, a mixture of the two gases or another oxygen-containing gas is used, and whether additional energy is added by means of an auxiliary flame.

An advantage of the device of the present invention is the possibility of introducing the hot gaseous solids suspension into the cooling device directly upon leaving the reaction chamber without the need of prior quenching.

The hot gaseous TiO$_2$ suspension enters tube 1 of the first constructional unit at a temperature of 600° to 1800° C. and a flow velocity of 30 m/sec to 150 m/sec, the wall temperature of this tube being kept low enough by water cooling to prevent the hot chlorine from attacking and corroding the wall material, and the tapering cone of this tube being shaped in such a manner that practically no deposits will form on its inner wall and that no abrasion is suffered by scrub solids particles either. The gaseous solids suspension flows through the narrower tube 2 at increased velocity to enter tube 3, where its volume is expanded while its velocity is slowed down. Having passed tube 3 of the first constructional unit, the gaseous solids suspension enters tube 1 of the second constructional unit, flows through it in an analogous manner, then passes the third constructional unit as well as any further constructional units in the same way and, finally, having passed tube 3 of the last constructional unit and being cooled down to the desired temperature, passes into the subsequent separation equipment, e.g., a cyclone or a bag filter where the titanium dioxide is separated from the gaseous constituents of the reaction mixture in a known manner. The tubes constituting a constructional unit, i.e., tubes 1, 2 and 3, as well as the constructional units among each other are connected in a suitable manner, e.g., by flanges. In the No. 2 tubes of the constructional units, the TiO$_2$ carried along shows practically no tendency of depositing because of the high velocity of the gaseous solids suspension. In the wider No. 3 tubes, a higher tendency to depositing was to be expected since the TiO$_2$ particles slowed down in their velocity would more easily obey the forces of gravity, which would then result in their paths being bent and the number of impacts of particles on the inner tube walls being reduced. Suprisingly, the No. 3 tubes showed practically no tendency to TiO$_2$ particle deposition in any of the constructional units. It is assumed that the is due to eddy formation behind the extension from tube 2 to tube 3, which increases the number of impacts of TiO$_2$ particles on the inner walls along the length of tube 3.

The described effects occur analogously in all of the constructional units so that throughout the device described in the invention there is much less tendency to solids deposition than in a comparable device consisting of a straight watercooled tube of uniform diameter D. Accordingly, the invented device shows better heat transfer and lower demand of scrub solids.

An advantageous embodiment of the invention features a ratio of the inner diameter D of tube 3 to the inner diameter d of tube 2 of 1.1:1 to 2.0:1, preferably of 1.3:1 to 1.5:1.

The inner diameter at the inlet of tube 1 is the same as the inner diameter D of tube 3, and the inner diameter of the opening of tube 1 into tube 2 is the same as the inner diameter d of tube 2. This facilitates the joining of the various constructional units to make a unitary device. The present invention also allows other forms of embodiment, i.e., the inner diameters d and D may vary from unit to unit provided D is larger than d.

Preferred embodiments of the invented device further feature the following proportions: Length l to inner diameter d of tube 2 ranging between 10:1 and 50:1, preferably between 25:1 and 35:1, and correspondingly, length L to inner diameter D of tube 3 ranging between 10:1 and 50:1, preferably between 20:1 and 30:1.

The ratio of length L' of tube 1 to the difference between half the inner diameters of tube 3 and tube 2, i.e. D/2 and d/2, ranges between 20:1 and 5:1, preferably between 18:1 and 12:1.

This ratio $L'/(D/2-d/2)$ is a measure of the angle of the conical narrowing of tube 1. It must not be too small, otherwise the surface of attack offered to the scrub solids impinging in flow direction will become too great with the result that appreciable material abrasion will occur in the conical section.

The number of constructional units required to make up the device of the invention is dependent, on the one hand, on the inner dimensions and the wall thicknesses of tubes 1, 2 and 3, the design of jacket tubes 4 and the materials of construction used for these tubes. On the other hand, process considerations play an important role, i.e., inlet temperature of the hot gaseous solids suspension at the first constructional unit, the desired exit temperature at the last constructional unit, flow velocity and composition of the suspension as well as the quantity and particle size of the scrub solids used and the volume of inert gas added.

For a device dimensioned in the preferred ranges as specified in claims 3 and 5–7, operated at an inlet temperature of the gaseous solids suspension into the device of 600° to 1800° C. and an exit temperature of 200° to 500° C., a flow velocity of the gaseous solids suspension of 30 to 150 m/sec and additions of up to 20 percent by weight of scrub solids related to the solids in the gaseous solids suspension, the number of constructional units required to make up the device ranges between 1 and 12, preferably between 2 and 6.

Materials suited for the construction of the invented device and resistant to corrosion by the hot chlorine-containing reaction gases as well as to abrasion by the scouring scrub solids are nickel, nickel-chromium alloys or stainless steels.

The embodiment of the invention comprise devices in which the individual constructional units are uniform or different in length. Also, the individual tubes forming a constructional unit, i.e. tubes 1, 2 and 3, may differ in length.

In a preferred embodiment of the invention, tubes 2 and 3 are practically equal in length.

Tubes 1, 2 and 3 may, as shown in the drawing, be jacketed individually by jacketing tube 4. Or they may be jacketed by tubes of larger length, i.e. one jacket surrounding several individual tubes as, e.g., a complete constructional unit or even several constructional units. In another embodiment of the invention, the invented device is sprayed with a coolant instead of being surrounded by jacketing tubes. A preferred coolant is water.

The position of the central axis of the tubes of the device is usually horizontal; it may, however, just as well be inclined at any desired angle to or at right angles to the horizontal.

The device of the invention may be operated under atmospheric pressure, reduced or elevated pressure, as it is, for instance, when used as a heat exchanger for the indirect cooling of the reaction mixture obtained in the production of fine-sized oxides of elements whose chlorides are highly volatile according to the method described in the German Patent DE-PS No. 23 50 469.

The device of the invention is described in detail by the drawing and the following examples.

The drawing shows an embodiment consisting of 2 equal constructional units whose tubes 1, 2 and 3 are surrounded by jacketing tubes 4, which are provided with inlet tubes 5 and outlet tubes 6 for the application of a coolant, the inlet and outlet tubes of two neighboring jackets being connected with each other. The lengths l and L of tubes Nos. 2 and 3 are almost equal and larger than length L' of tubes No. 1. Not shown are the connection tubes between the reaction chamber and tube 1 of the first constructional unit and tube 3 of the last constructional unit and the solids collector.

EXAMPLE 1

The device used was manufactured to consist of water-cooled jacketed stainless steel tubes as shown in the drawing and to comprise two equal constructional units. The tubes were dimensioned as follows: tubes 1: $L'=0.5$ m; tubes 2: $l=5.5$ m and $d=0.175$ m; tubes 3: $L=6.0$ m and $D=0.232$ m.

The total length of the device, calculated from the inlet of tube 1 of the first constructional unit to the outlet of tube 3 of the second constitutional unit, was 24 m.

The gaseous $TiO_2$ suspension entering the device at a temperature of 630° C. and a flow velocity of 36 m/sec had the following chemical composition:
- 28.5% by weight $TiO_2$ (fine-sized, produced in the vapor phase)
- 1.5% by weight $TiO_2$ (coarse, added as scrub solids)
- 60.0% by weight chlorine
- 4.0% by weight oxygen
- 2.0% by weight nitrogen
- Balance: carbon dioxide and hydrogen chloride.

The scrub solids consisted of calcined titanium dioxide ranging in particle size between 0.2 and 4.0 mm; suspended in a stream of nitrogen having a velocity of 10 m/sec, they were injected coaxially into the gaseous $TiO_2$ suspension in a downstream location immediately behind the reaction chamber.

The gaseous $TiO_2$ suspension left tube 3 of the second constructional unit at a temperature of 490° C. and a flow velocity of 30 m/sec, passing from there through a cooled connecting tube into the filtering device where the titanium dioxide was collected from the suspension by known method.

The average heat transfer coefficient of this system was 168 kJ/($m^2 \cdot h \cdot K$), cf. "Die gesetzlichen Einheiten in der Technik" issued by DIN Deutsches Institut für Normung e.V., 5th edition (1980) page 234.

Consumption of scrub solids amounted to 5% by weight related to the total quantity of titanium dioxide contained in the gaseous $TiO_2$ suspension. In eight months of operation, none of the tubes showed any deposits or abrasions worth mentioning.

EXAMPLE 2

(for comparison)

The device used consisted of a water-cooled jacketed tube constructed of the same stainless steel as the device described in Example 1. It had a length of 24 m and a uniform inner diameter of 0.232 m.

The gaseous $TiO_2$ suspension entering the device had a temperature of 630° C., a flow velocity of 35 m/sec and the following chemical composition:
- 27.2% by weight $TiO_2$ (fine-sized, obtained in the vapor phase)
- 4.8% by weight $TiO_2$ (coarse, added as scrub solids)
- 58.3% by weight chlorine
- 3.9% by weight oxygen
- 1.9% by weight nitrogen
- Balance: carbon dioxide and hydrogen chloride.

Particle size and method of introducing the $TiO_2$ scrub solids were the same as in Example 1. The gaseous $TiO_2$ suspension left the device at a temperature of 545° C. and at a velocity of 33 m/sec.

The average heat transfer coefficient was 84 $kJ/(m^2 \cdot h \cdot K)$.

The consumption of $TiO_2$ scrub solids required to prevent the formation of deposits was 15% by weight related to the total quantity of the titanium dioxide contained in the gaseous $TiO_2$ suspension.

The examples show that heat transfer is twice as high in the device of the invention as it is in a comparable conventional cooling tube of uniform inner diameter. The device may therefore be shorter in construction, which will save material and space. The quantity of $TiO_2$ scrub solids required to prevent the formation of deposits in the device of the invention is only one third of the quantity needed in a comparable conventional cooling tube. This means a saving in materials and an improvement in yield in the production of $TiO_2$.

The device described in the invention can be used to advantage in the cooling of hot gaseous solids suspensions, in particular hot gaseous $TiO_2$ suspensions resulting from the production of titanium dioxide by oxidation of titanium tetrachloride in the vapor phase.

What is claimed is:

1. A method for cooling a hot gaseous $TiO_2$ suspension resulting from the production of titanium dioxide by oxidation of titanium tetrachloride in the vapor phase comprising:
    passing said gaseous suspension through a first cooling zone having a generally conically tapering flow path having a length L', said flow path tapering downwardly in the direction of flow;
    passing the gaseous suspension from said first cooling zone through a second, contiguous cooling zone having a generally cylindrical flow path and said cylindrical flow path having a diameter d;
    passing the gaseous suspension from said second cooling zone through a third, contiguous cooling zone, said third cooling zone having a pathway of diameter D and the ratio $L'/(D/2-d/2)$ is from 20:1 to 5:1, the flow path of said gaseous suspension being abruptly expanded upon passing from said second cooling zone to said third cooling zone;
    said first, second and third cooling zones being externally cooled.

2. The method of claim 1 wherein said gaseous suspension is introduced into said first cooling zone at a flow velocity of 30 m/sec to 150 m/sec.

3. The method of claim 1 wherein said gaseous suspension contains up to 20% by weight of scrub solids based on the solids content of the gaseous suspension.

4. The method of claim 1 wherein the ratio D/d is from 1.1:1 to 2.0:1, preferably 1.3:1 to 1.5:1.

5. The method of claim 1 wherein said conically tapering flow path has a diameter at its largest end generally equal to the diameter of the pathway of said third cooling zone and a diameter at its smallest end generally equal to the diameter of said cylindrical flow path of said second cooling zone.

6. The method of claim 1 wherein the ratio of the length of said cylindrical flow path of the second cooling zone to the diameter of said cylindrical flow path of the second zone is from 10:1 to 50:1, preferably from 25:1 to 35:1.

7. The method of claim 1 wherein the ratio of the length of the pathway of the third cooling zone to the diameter of the pathway of the third cooling zone is from 10:1 to 50:1, preferably from 20:1 to 30:1.

8. The method of claim 1 wherein said first cooling zone, said second cooling zone and said third cooling zone comprises a cooling unit, and there are from 1 to 12, preferably 2 to 6 cooling units.

* * * * *